United States Patent
Xue et al.

(10) Patent No.: US 12,447,718 B2
(45) Date of Patent: Oct. 21, 2025

(54) MULTI-LAYER ROLLED COMPOSITE BOARD AND MANUFACTURING METHOD THEREFOR

(71) Applicant: BAOSHAN IRON & STEEL CO., LTD., Shanghai (CN)

(72) Inventors: Peng Xue, Shanghai (CN); Xiaodong Zhu, Shanghai (CN); Bo Yan, Shanghai (CN); Sihai Jiao, Shanghai (CN)

(73) Assignee: BAOSHAN IRON & STEEL CO., LTD., Shanghai (CN)

( * ) Notice: Subject to any disclaimer, the term of this patent is extended or adjusted under 35 U.S.C. 154(b) by 0 days.

(21) Appl. No.: 17/780,124

(22) PCT Filed: Nov. 25, 2020

(86) PCT No.: PCT/CN2020/131388
§ 371 (c)(1),
(2) Date: May 26, 2022

(87) PCT Pub. No.: WO2021/104292
PCT Pub. Date: Jun. 3, 2021

(65) Prior Publication Data
US 2022/0410533 A1     Dec. 29, 2022

(30) Foreign Application Priority Data

Nov. 27, 2019  (CN) .............. 201911179893

(51) Int. Cl.
*B32B 15/01*     (2006.01)
*B21B 1/22*     (2006.01)
(Continued)

(52) U.S. Cl.
CPC .............. *B32B 15/011* (2013.01); *B21B 1/22* (2013.01); *C21D 8/0205* (2013.01);
(Continued)

(58) Field of Classification Search
CPC ....... B32B 15/011; B21B 1/22; C21D 8/0236; C21D 8/0247; C22C 38/02; C22C 38/04; C22C 38/06; C22C 38/22; C22C 38/28
See application file for complete search history.

(56) References Cited

U.S. PATENT DOCUMENTS

2018/0037970 A1* 2/2018 Matsumura ............. C22C 38/04

FOREIGN PATENT DOCUMENTS

| CN | 1273544 A | 11/2000 |
| CN | 105772507 A * | 7/2016 |

(Continued)

OTHER PUBLICATIONS

Fu et al., CN-109692884-A Google Patents machine translation printed on Apr. 24, 2023, Apr. 30, 2019, entire translation (Year: 2019).*

(Continued)

*Primary Examiner* — Anthony M Liang
(74) *Attorney, Agent, or Firm* — Lei Fang, Esq.; Smith Tempel Blaha LLC

(57) ABSTRACT

Disclosed is a multi-layer rolled composite board, comprising a transition layer provided between two adjacent composite layers, wherein the transition layer is an anisotropic steel sheet. Also disclosed is a manufacturing method for the multi-layer rolled composite board. The multi-layer rolled composite board of the present invention can be greatly transformed according to different compositions and processes so as to achieve different strength grades ranging from 150 MPa to 1700 MPa, thereby providing the basis for different specific mechanical properties for the whole steel sheet.

17 Claims, 2 Drawing Sheets

(51) Int. Cl.
*C21D 8/02* (2006.01)
*C22C 38/02* (2006.01)
*C22C 38/04* (2006.01)
*C22C 38/06* (2006.01)
*C22C 38/22* (2006.01)
*C22C 38/28* (2006.01)

(52) U.S. Cl.
CPC ......... *C21D 8/0226* (2013.01); *C21D 8/0236* (2013.01); *C21D 8/0247* (2013.01); *C22C 38/02* (2013.01); *C22C 38/04* (2013.01); *C22C 38/06* (2013.01); *C22C 38/22* (2013.01); *C22C 38/28* (2013.01)

(56) References Cited

FOREIGN PATENT DOCUMENTS

| CN | 109692884 A | * | 4/2019 | ............... B21B 1/38 |
|---|---|---|---|---|
| CN | 109695000 A | | 4/2019 | |
| EP | 0596133 A1 | | 5/1994 | |
| EP | 2669397 A1 | * | 12/2013 | ............... B21B 3/00 |
| JP | H0295842 A | | 4/1990 | |
| JP | H05293673 A | | 11/1993 | |
| JP | H0790492 A | | 4/1995 | |
| JP | 2010132938 A | | 6/2010 | |
| KR | 20050000566 A | | 1/2005 | |
| WO | WO-2018095258 A1 | * | 5/2018 | ............... B21B 1/38 |
| WO | WO-2018151318 A1 | * | 8/2018 | ............... B21B 1/38 |

OTHER PUBLICATIONS

International Search Report for PCT/CN2020/131388 dated Feb. 4, 2021.
International Written Opinion for PCT/CN2020/131388 dated Feb. 4, 2021.
Non-official translation: Optimum Orientation of Deformed Rocks and Metals, Introduction to Modern Structural Analysis; 3. Driving Force of Recrustallization; May 31, 1991; pp. 122-124.
The Extended European search report dated Oct. 11, 2022 for the corresponding EP App No. 20893474.5.
The JP OA for JP App No. 2022-530327 dated Jun. 27, 2023.

* cited by examiner

MULTI-LAYER ROLLED COMPOSITE BOARD AND MANUFACTURING METHOD THEREFOR

CROSS-REFERENCE TO RELATED APPLICATIONS

This application is a 371 U.S. National Phase of PCT International Application No. PCT/CN2020/131388 filed on Nov. 25, 2020, which claims benefit and priority to Chinese patent application No. CN 201911179893.X filed on Nov. 27, 2019, the contents of each of the above listed applications are incorporated by reference herein in their entiries.

TECHNICAL FIELD

The present disclosure relates to a steel plate and a manufacturing method therefor, in particular to a rolled clad plate and a manufacturing method therefor.

BACKGROUND ART

Roll cladding is a special rolling method performed by contacting two or more metal plates with clean surfaces, and utilizing shear force generated by rolling under high temperature and large deformation to destroy the surface layer of the metal contact surface, so that fresh metal is extruded and interface metallurgical bonding is realized under the action of external force. Roll cladding is a common method for producing clad plates, and the process is mature and stable.

Multilayer rolled clad metal plate is prepared from two or more metals through bonding by hot rolling and cladding, in which not only the costs are reduced, but also the physical and chemical properties that a single component metal does not have may be obtained. For example, the cladding of a metal with higher strength to a metal with higher toughness metal can unify the strength and toughness of the material and can be used in the manufacture of various engineering structural parts.

Due to the influence of the production environment and the limitation of production capacity of the equipment, it is prone to generate oxides and defects that hinder the binding at the bonding interface of the clad plate, and it is also easy to diffuse elements in the process of hot rolling and cladding, and even the performance of substrate and clad material are independently affected in serious cases. For example, in the clad plate obtained by cladding 22MnB5 as a substrate and IF steel as a cladding material, 22MnB5 provides a basis of strength and IF steel improves surface formability, but during cladding, severe C diffusion will lead to a decrease in the strength of 22MnB5 layer and the toughness of IF steel layer.

SUMMARY

One of the objects of the present disclosure is to provide a multilayer rolled clad plate, which can vary greatly according to different compositions and processes, and can achieve different strength grades from 100 MPa to 1700 MPa, providing different specific mechanical properties for the overall steel plate.

To achieve the above object, the present disclosure proposes a multilayer rolled clad plate, which comprises a transition layer between two adjacent cladding layers, wherein the transition layer is an anisotropic thin steel plate.

In the technical solution of the present disclosure, the anisotropic thin steel plate plays a role in hindering the diffusion of components between the other layers of clad plate. In addition, the anisotropic thin steel plate can play a role in enhancing the adhesion strength between the layers of the clad plate.

Further, in the multilayer rolled clad plate according to the present disclosure, the anisotropic thin steel plate is a cold rolled steel plate or a hot rolled acid-pickled steel plate.

In the above solution, the orientation degree of the anisotropic thin steel plates can be controlled by controlling the cold rolling reduction rate, annealing temperature or the final rolling temperature of the hot rolling.

Further, in the multilayer rolled clad plate according to the present disclosure, the anisotropic thin steel plate has an orientation degree that satisfies: $1.25 \geq AI \geq 1.05$ before assembling a blank.

In the technical solution of the present disclosure, when the orientation degree of the anisotropic thin steel plate is high, the defect density within the grain increases, the recrystallization and grain growth rate of austenite increase, and the recrystallization driving force in the direction vertical to the steel plate is greater than the steel plate driving force in the direction parallel to the steel plate. Therefore, in the process of heating and soaking of steel plates during hot rolling, the higher orientation degree of steel plate is very conducive to the anisotropic thin steel plate as a transition layer, dissolving the oxide film on the surface of the base material when assembling a blank, and rapid metallurgical binding with other layers of the clad plate. Considering that the orientation degree is too large, the diffusion rate of components of anisotropic thin steel plates in the cladding layer increases, and it is not easy to control the diffusion of components between layers. Based on the above, the anisotropic thin steel plate is controlled to ensure that the orientation degree before assembling a blank satisfies: $1.25 \geq AI \geq 1.05$.

Further, in the multilayer rolled clad plate according to the present disclosure, the transition layer comprises one or more layers.

Further, in the multilayer rolled clad plate according to the present disclosure, the thickness of each layer of the anisotropic thin steel plate is less than 5% of the total thickness of the multilayer rolled clad plate, preferably less than 1% of the total thickness.

Further, in the multilayer rolled clad plate according to the present disclosure, the thickness of each layer of the anisotropic thin steel plate before rolling is 0.5 to 10.0 mm.

Further, in the multilayer rolled clad plate according to the present disclosure, the thickness of each layer of the anisotropic thin steel plate before rolling is 1 to 3 mm.

Further, in the multilayer rolled clad plate according to the present disclosure, each layer of the anisotropic thin steel plate may be the same or different.

Further, in some embodiment of the multilayer rolled clad plate according to the present disclosure, the anisotropic thin steel plate comprises the following chemical elements in weight percentages: C: 0.01-0.10%; Si: 0.01-0.5%; Mn: 0.5-2.5%; Al: 0.01-0.06%; Ti$\leq$0.06%; Cr$\leq$0.50%; Mo$\leq$0.30%; and a balance of Fe and other unavoidable impurities. Preferably, the anisotropic thin steel plate comprises the following chemical elements in weight percentages: C: 0.01-0.10%; Si: 0.01-0.4%; Mn: 1.0-2.3%; Al: 0.02-0.04%; Ti$\leq$0.05%; Cr$\leq$0.50%; Mo$\leq$0.30%; and a balance of Fe and other unavoidable impurities.

The multilayer rolled clad plate according to the present disclosure comprises a substrate layer, a transition layer located on one or both sides of the substrate layer, and a cladding material layer located on the outside of the transition layer. In the final product, the thickness of the substrate layer is usually in the range of 0.5-4.0 mm, such as 1.50-2.0 mm. The cladding material layer is a steel plate that is used to be cladded on the substrate layer, and the thickness of each cladding material layer may be the same or different. In the final product, the thickness of each cladding material layer is usually in the range of 0.05-0.4 mm, such as 0.15-0.25 mm. Exemplary structure of the multilayer rolled clad plate according to the present disclosure is a cladding material layer—a transition layer—a substrate layer, a cladding material layer—a transition layer—a substrate layer—a transition layer—a cladding material layer.

The substrate layer may be a variety of steels well known in the art, including but not limited to martensitic steel, mild steel, high strength steel, high precipitation strengthened steel and the like. The cladding material layer may be a variety of steels well known in the art, including but not limited to mild steel, high strength steel and martensitic steel and the like. Exemplary martensitic steel comprises the following chemical elements in weight percentages: C: 0.2-0.3%; Si: 0.1-0.5%; Mn: 1.0-1.6%; Al: 0.01-0.25%; B: 0.001-0.005%; Ti≤0.05%; Cr≤0.3%; Mo≤0.2%; and a balance of Fe and unavoidable impurities. Exemplary mild steel comprises the following chemical elements in weight percentages: C: 0.0005-0.003%; Si: 0.001-0.01%; Mn: 0.1-0.5%; Al: 0.01-0.04%; Ti≤0.06%; and a balance of Fe and unavoidable impurities. In some embodiments, the mild steel comprises the following chemical elements in weight percentages: C: 0.01-0.04%, Si: 0.01-0.05%; Mn: 0.1-0.5%; Al: 0.01-0.04%, and a balance of Fe and unavoidable impurities. Exemplary high strength steel comprises the following chemical elements in weight percentages: C: 0.1-0.3%; Si: 1.3-2.0%; Mn: 1.5-3.0%; Al: 0.01-0.05%; Ti: 0.01-0.03%; Mo≤0.3%; and a balance of Fe and unavoidable impurities. In some embodiments, high strength steel comprises the following chemical elements in weight percentages: C: 0.05-0.15%; Si: 0.1-0.4%; Mn: 1.5-3.0%; Al: 0.01-0.05%; Ti: 0.01-0.03%; Cr: 0.4-0.6%, Mo: 0.1-0.3%; and a balance of Fe and unavoidable impurities. Exemplary high precipitation strengthened steel comprises the following chemical elements in weight percentages: C: 0.03-0.08%; Si: 0.1-0.4%; Mn: 1.0-1.5%; Al: 0.01-0.05%; Ti: 0.05-0.12%; and a balance of Fe and unavoidable impurities.

Preferably, the C content of the transition layer is between that of the substrate layer and the cladding material layer.

Further, in the multilayer rolled clad plate according to the present disclosure, there is a metallic or non-metallic plating layer on at least one surface of the multilayer rolled clad plate.

Of course, in some other embodiments, there may be no plating layer on the surface of the multilayer rolled clad plate.

Accordingly, another object of the present disclosure is to provide a manufacturing method for the above multilayer rolled clad plate, by which a multilayer rolled clad plate may be obtained.

To achieve the above object, the present disclosure proposes a manufacturing method for the above multilayer rolled clad plate comprising the following steps:

(1) Providing a transition layer between adjacent cladding layers for assembling a blank, vacuumizing between layers;

(2) clad rolling: the blank is heated to 1100-1260° C. and held for 0.5 hours or more, preferably 0.6 hours or more, wherein a final rolling temperature is controlled to be greater than 820° C., and after rolling, the blank is cooled at a rate of 30-100° C./s, and then coiled, and the coiling temperature is controlled to be 20-750° C.

Further, the manufacturing method according to the present disclosure further comprises Step (3) of cold rolling. In some embodiments, the cold rolling deformation is ≥40%.

Further, the manufacturing method according to the present disclosure further comprises Step (4) of annealing: wherein the plate is soaked at a soaking temperature of 700-880° C., and then cooled at a rate of 3-20° C./s to a rapid cooling starting temperature of 600-780° C., preferably 600-770° C., and then cooled at a rate of 20-1000° C./s, preferably 40-1000° C./s to 150-550° C.

Further, the manufacturing method according to the present disclosure further comprises Step (5) of tempering: wherein a tempering temperature is 150-550° C., and a tempering time is 100 s-400 s.

Further, the manufacturing method according to the present disclosure further comprises a step of leveling.

The multilayer rolled clad plate according to the present disclosure have the following advantages and beneficial effects as compared with the prior art:

The multilayer rolled clad plate according to the present disclosure can vary greatly based on different compositions and processes, and different strength levels from 100 MPa to 1700 MPa can be realized, providing different specific mechanical properties for the overall steel plate.

In addition, the manufacturing method according to the present disclosure also has the above advantages and beneficial effects.

DETAILED DESCRIPTION

Figure 1:
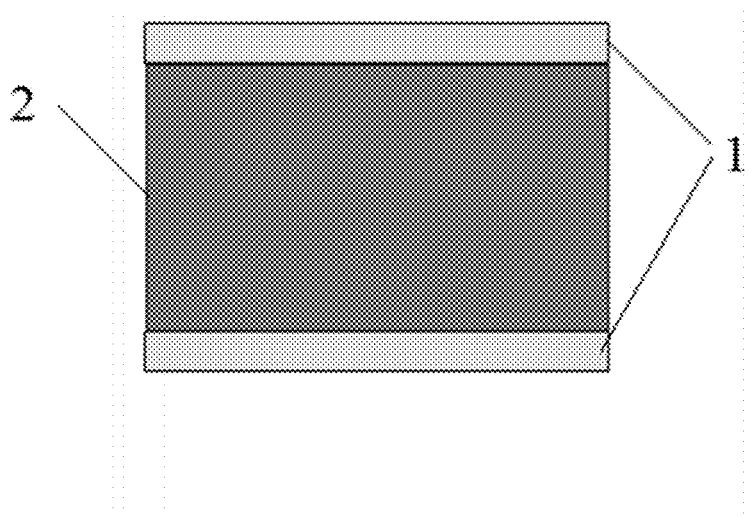
FIG. 1 shows the structure of a comparative clad plate according to Comparative Example 1.

The present disclosure will be further described with reference to the accompanying drawings of the specification and specific embodiments of the multilayer rolled clad plate according to the present disclosure and the manufacturing method thereof to make a further explanation and description, however, the explanation and description does not constitute an improper limitation of the technical solution of the present disclosure.

Examples 1-6 and Comparative Example 1

The multilayer rolled clad plate of Example 1-6 was prepared by the following steps:

(1) providing a transition layer between adjacent cladding layers for assembling a blank, and vacuumizing between layers, wherein the mass percentage of each blank layer is shown in Table 1. It should be noted that the cladding layer in the present disclosure includes a substrate layer and a cladding material layer.

(2) clad rolling: the blank is heated to 1100-1260° C. and held for 0.5 hours or more, preferably 0.6 hours or more; wherein the final rolling temperature is controlled to be greater than 820° C., and after rolling, the blank was cooled at a rate of 30-100° C./s, and then coiled, and the coiling temperature was controlled to be 20-750° C.

In some embodiments, the manufacturing method further comprised the step (3) of cold rolling.

In further embodiments, the manufacturing method further comprised the step (4) of annealing: wherein the plate was soaked at a soaking temperature of 700-880° C., and then cooled at a rate of 3-20° C./s to a rapid cooling starting temperature of 600-780° C., preferably 600-770° C., and then cooled at a rate of 20-1000° C./s, preferably 40-1000° C./s to 150-550° C.

In some other embodiments, the manufacturing method further comprised the step (5) of tempering: wherein the tempering temperature was 150-550° C., and the tempering time was 100 s-400 s.

In some other embodiments, the manufacturing method further comprised the step of leveling.

The mass percentages of each chemical element of the multilayer rolled clad plate of Example 1-6 and the comparative clad plate of Comparative Example 1 are shown in Table 1.

TABLE 1

(wt %, with a balance of Fe and other unavoidable impurities)

| | Chemical elements of blank layer | C | Si | Mn | Al | B | Ti | Cr | Mo | AI |
|---|---|---|---|---|---|---|---|---|---|---|
| Example 1 | Substrate layer | 0.241 | 0.226 | 1.258 | 0.0448 | 0.0028 | 0.025 | 0.14 | — | — |
| | Cladding material layer | 0.0013 | 0.005 | 0.143 | 0.0255 | — | 0.022 | — | — | — |
| | Transition layer | 0.066 | 0.064 | 1.358 | 0.0375 | — | 0.0439 | — | — | 1.15 |
| Example 2 | Substrate layer | 0.288 | 0.32 | 1.67 | 0.0331 | 0.0028 | 0.021 | — | — | — |
| | Cladding material layer | 0.0021 | 0.004 | 0.152 | 0.0211 | — | — | — | — | — |
| | Transition layer | 0.083 | 0.052 | 1.134 | 0.0231 | — | 0.012 | — | — | 1.07 |
| Example 3 | Substrate layer | 0.0011 | 0.004 | 0.312 | 0.0211 | — | — | — | — | — |
| | Cladding material layer | 0.098 | 0.26 | 2.28 | 0.0249 | — | 0.021 | 0.55 | 0.22 | — |
| | Transition layer | 0.034 | 0.045 | 1.344 | 0.0224 | — | — | — | — | 1.23 |
| Example 4 | Substrate layer | 0.188 | 1.71 | 2.72 | 0.0321 | | 0.012 | | | — |
| | Cladding material layer | 0.0017 | 0.005 | 0.153 | 0.032 | | 0.0309 | | | — |
| | Transition layer | 0.055 | 0.34 | 1.23 | 0.0229 | | | | | 1.17 |
| Example 5 | Substrate layer | 0.172 | 1.55 | 1.82 | 0.0324 | | 0.015 | | 0.211 | — |
| | Cladding material layer | 0.027 | 0.03 | 0.342 | 0.0112 | | | | | — |
| | Transition layer | 0.034 | 0.12 | 1.13 | 0.0223 | | | | | 1.10 |
| Example 6 | Substrate layer | 0.068 | 0.226 | 1.358 | 0.0334 | | 0.0939 | | | — |
| | Cladding material layer | 0.223 | 0.126 | 1.325 | 0.216 | 0.0023 | | | 0.098 | — |
| | Transition layer | 0.098 | 0.23 | 2.21 | 0.0298 | | 0.019 | 0.481 | 0.21 | 1.16 |

| | Chemical elements of blank layer | C | Si | Mn | Al | B | Ti | Cr | Mo | — |
|---|---|---|---|---|---|---|---|---|---|---|
| Comparative Example 1 | Substrate layer | 0.241 | 0.226 | 1.258 | 0.0448 | 0.0028 | 0.025 | 0.14 | — | — |
| | Cladding material layer | 0.0013 | 0.005 | 0.143 | 0.0255 | — | 0.022 | — | — | — |

The specific process parameters of the multilayer rolled clad plate of Example 1-6 and the comparative clad plate of Comparative Example 1 are shown in Table 2.

TABLE 2

| | | Example 1 | Example 2 | Example 3 | Example 4 | Example 5 | Example 6 | Comparative Example 1 |
|---|---|---|---|---|---|---|---|---|
| Step (1) | Number of blank layers | 5 | 5 | 5 | 5 | 5 | 5 | — |
| | Thickness ratio of blank layers * | 20:1.5:180:1.5:20 | 22:2:182:2:22 | 20:1:180:1:20 | 20:1.5:182:1.5:20 | 25:2:170:2:25 | 18:2:190:2:18 | — |
| Step (2) | Heating temperature, ° C. | 1260 | 1100 | 1150 | 1180 | 1200 | 1230 | 1260 |
| | Holding time, h | 1 | 1.5 | 0.5 | 1 | 1.2 | 1.8 | 1 |
| | Final rolling temperature, ° C. | 880 | 840 | 890 | 880 | 870 | 900 | 880 |
| | Cooling rate, ° C. | 50 | 100 | 60 | 70 | 100 | 80 | 50 |
| | Coiling temperature, ° C. | 650 | 500 | 750 | 400 | 50 | 200 | 650 |
| Step (3) | Cold rolled reduction rate, % | 50 | 60 | 40 | 45 | — | 70 | 50 |
| Step (4) | Annealing temperature, ° C. | 840 | 880 | 700 | 850 | — | 720 | 840 |
| | Cooling rate, ° C./s | 5 | 3 | 20 | 10 | — | 5 | 5 |
| | Rapid cooling starting temperature, ° C. | 750 | 780 | 600 | 710 | — | 650 | 750 |
| | Rapid cooling rate, ° C./s | 750 | 1000 | 30 | 70 | — | 20 | 750 |
| | Final cooling temperature, ° C. | 200 | 150 | 550 | 200 | — | 240 | 200 |
| Step (5) | Tempering temperature, ° C. | 200 | 150 | 550 | 410 | — | 240 | 200 |
| | Tempering time, s | 280 | 400 | 180 | 240 | — | 100 | 280 |

*: each blank layer comprises a cladding material layer: a transition layer: a substrate layer: a transition layer: a cladding material layer in sequence, and the thickness unit is mm.

The relevant performance parameters of the multilayer rolled clad plate of Example 1-6 and its advantages after cladding are shown in Table 3.

TABLE 3

| No. | Tensile strength (MPa) | Yield strength (MPa) | Elongation (%) | Advantage after cladding |
|---|---|---|---|---|
| Example 1 | 1510 | 1208 | 8.3 | Mild steel cladding layer + martensitic steel substrate layer is adopted, so that the steel plate after cladding is a 1500 MPa high strength steel, which has excellent bend processing performance |
| Example 2 | 1728 | 1401 | 6.8 | Mild steel cladding layer + martensitic steel substrate layer is adopted, so that the steel plate after cladding is a 1700 MPa high strength steel, which has excellent bend processing performance. |
| Example 3 | 184 | 118 | 25.2 | High strength steel cladding layer + mild steel substrate layer is adopted, so that the steel plate after cladding is a mild steel for stamping, which has excellent pick resistance. |
| Example 4 | 1282 | 911 | 16.6 | Mild steel cladding layer + high strength steel substrate layer is adopted, so that the steel plate after cladding is a high-strength cold-rolled QP steel with a high Si content, which has good pick resistance of surface coating. |
| Example 5 | 1082 | 778 | 21.4 | Mild steel cladding layer + high strength steel substrate layer enables the steel plate after cladding to be a high-strength hot-rolled QP steel with a high Si content, which has good surface quality |
| Example 6 | 871 | 804 | 9.6 | Martensitic steel cladding layer + high precipitation strengthened steel substrate layer is adopted, so that the steel plate after cladding can avoid the problem of decarburizing the surface of the precipitation reinforced steel and affecting the surface hardness. |

FIG. 1 shows the structure of the comparative clad plate according to Comparative Example 1.

Figure 2:
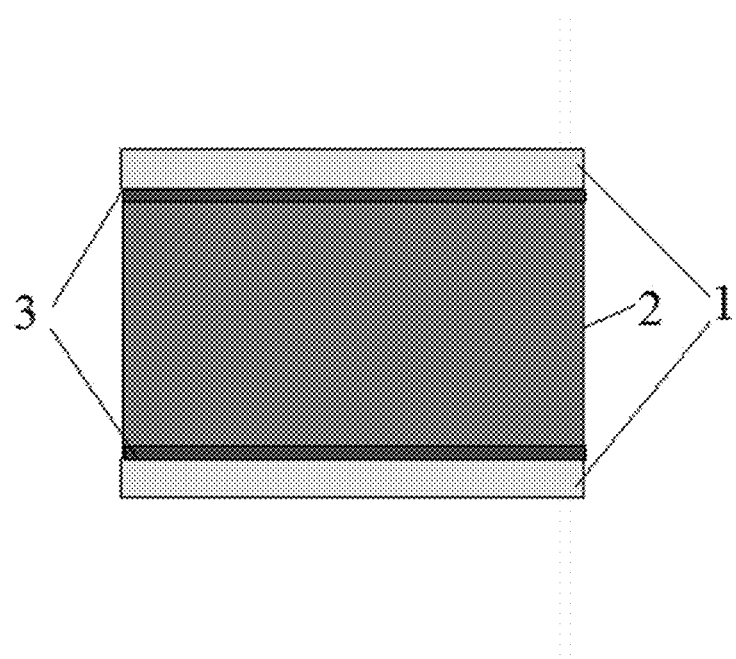
FIG. 2 shows the structure of a multilayer rolled clad plate according to Example 1.

FIG. 2 shows the structure of the multilayer rolled clad plate according to Example 1.

According to FIG. 1 and FIG. 2, it can be seen that compared to the comparative clad plate comprising the structure of only three layers (including a substrate layer 2 and two cladding material layers 1 cladded with the substrate layer 2), the multilayer rolled clad plate of Example 1 according to the present disclosure has a transition layer 3 between the cladding material layer 1 and the substrate layer 2, and the transition layer 3 is an anisotropic thin steel plate.

It should be noted that, in some other embodiments, the transition layer 3 may also have multiple layers.

The anisotropic thin steel plate of the transition layer 3 is a cold-rolled steel plate or a hot-rolled acid-pickled steel plate, and the orientation degree before assembling a blank satisfies $1.25 \geq AI \geq 1.05$, and the thickness of the anisotropic thin steel plate in each layer is less than 5% of the total thickness of the multilayer rolled clad plate.

In some other embodiments, there is a metallic or non-metallic plating layer on at least one surface of the multilayer rolled clad plate.

Figure 3:
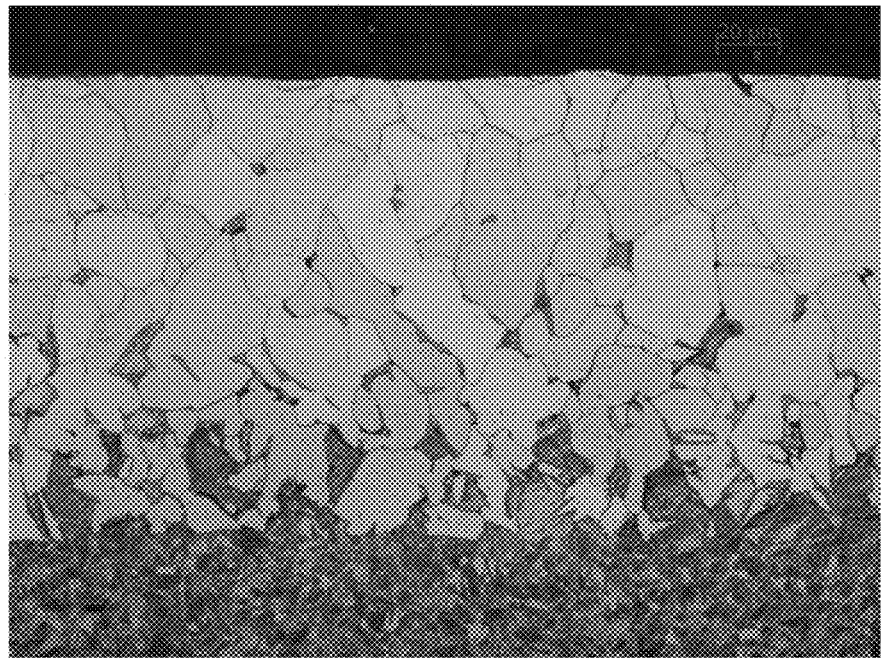
FIG. 3 is a photograph showing a microscopic metallographic structure of the comparative clad plate according to Comparative Example 1.
Figure 4:
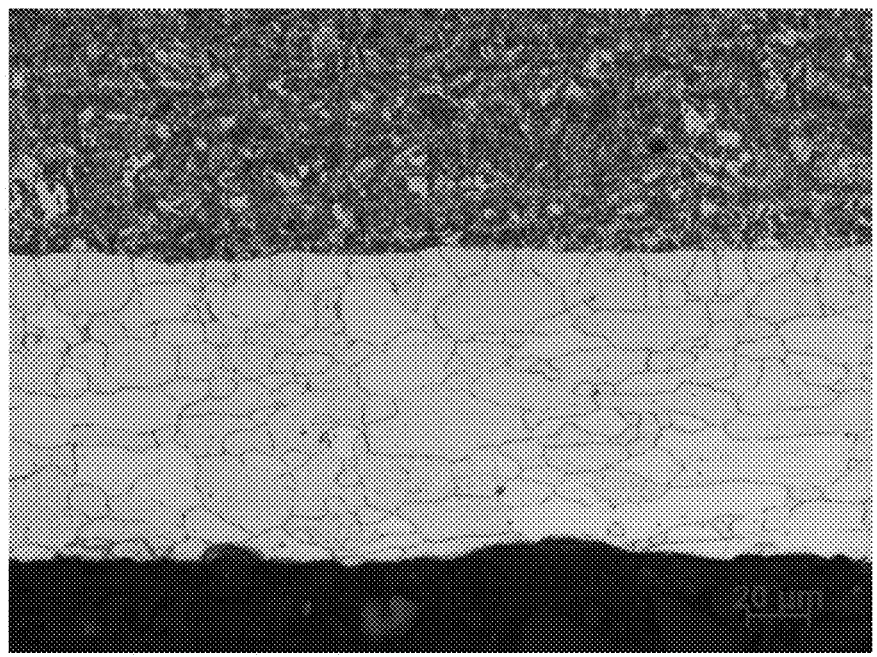
FIG. 4 is a photograph showing a microscopic metallographic structure of the multilayer rolled clad plate according to Example 1.

FIG. 3 is a photograph showing a microscopic metallographic structure of the comparative clad plate according to Comparative Example 1;

FIG. 4 is a photograph showing a microscopic metallographic structure of the multilayer rolled clad plate according to Example 1.

According to FIG. 3 and FIG. 4, it can be seen that compared to the comparative clad plate of Comparative Example 1, the multilayer rolled clad plate of Example 1 has significantly improved C diffusion between the cladding material layer 1 and the substrate layer 2. This is because that the C content plays a critical role in strength. The diffusion of C atoms belongs to gap diffusion with a high diffusion rate, especially when there is a large carbon potential difference between both sides of the clad interface, C atom is very easy to diffuse, in serious cases even the respective properties of the substrate layer 2 and the cladding material layer 1 are effected. Serious C diffusion leads to a decrease in the strength of the substrate layer and in the toughness of the cladding layer. The anisotropic thin steel plate having a C content between the substrate layer 2 and the cladding material layer 1 is selected as the transition layer 3, which can effectively reduce the carbon potential difference between two sides of the clad interface and greatly slow down the C diffusion.

The thickness of the transition layer 3 should be relatively thin, this is because if the thickness of the transition layer 3 is thick, the bonding strength after roll cladding depends on the material strength of the transition layer 3 and low strength of the transition layer 3 will reduce the bonding performance of the metal clad plate. If the thickness of the transition layer 3 is too thin, it does not play a role in preventing the diffusion of elements.

As can be seen from FIG. 4, the bonding performance of the clad interface of Example 1 in the present disclosure is better.

Based on the above, the multilayer clad plate of the present disclosure can vary greatly according to different compositions and processes, and can achieve different strength grades from 100 MPa to 1700 MPa, providing different specific mechanical properties for the overall steel plate.

In addition, the manufacturing method according to the present disclosure also has the above advantages and beneficial effects.

It's to be noted that the prior art portions in the protection scope of the present disclosure are not limited to the examples set forth in the present application document. All the prior art contents not contradictory to the technical solution of the present disclosure, including but not limited to prior patent literatures, prior publications, prior public uses and the like, may all be incorporated into the protection scope of the present disclosure.

In addition, the ways in which the various technical features of the present disclosure are combined are not limited to the ways recited in the claims of the present disclosure or the ways described in the specific examples. All the technical features recited in the present disclosure may be combined or integrated freely in any manner, unless contradictions are resulted.

It should also be noted that the examples set forth above are only specific examples according to the present disclosure. Obviously, the present disclosure is not limited to the above examples. Similar variations or modifications made thereto can be directly derived or easily contemplated from the present disclosure by those skilled in the art. They all fall in the protection scope of the present disclosure.

What is claimed is:

1. A multilayer rolled clad plate comprising a transition layer between two adjacent cladding layers, and a substrate layer, wherein the transition layer is an anisotropic steel plate, wherein the thickness of each layer of the anisotropic steel plate is less than 5% of the total thickness of the multilayer rolled clad plate,
wherein the anisotropic steel plate comprises the following chemical elements in weight percentages: C: 0.01-0.10%; Si: 0.01-0.5%; Mn: 0.5-2.5%; Al: 0.01-0.06%; Ti ≤ 0.06%; Cr ≤ 0.50%; Mo ≤ 0.30%; and a balance of Fe and unavoidable impurities;
wherein the substrate layer is a mild steel or a high strength steel;
wherein when the substrate layer is a mild steel, the mild steel comprises the following chemical elements in weight percentages: C: 0.0005-0.003%; Si: 0.001-0.01%; Mn: 0.1-0.5%; Al: 0.01-0.04%; Ti ≤ 0.06%; and a balance of Fe and unavoidable impurities; or the mild steel comprises the following chemical elements in weight percentages: C: 0.01-0.04%, Si: 0.01-0.05%; Mn: 0.1-0.5%; Al: 0.01-0.04%, and a balance of Fe and unavoidable impurities;
wherein when the substrate layer is a high strength steel, the high strength steel comprises the following chemical elements in weight percentages: C: 0.1-0.3%; Si: 1.3-2.0%; Mn: 1.5-3.0%; Al: 0.01-0.05%; Ti: 0.01-0.03%; Mo ≤ 0.3%; and a balance of Fe and unavoidable impurities; or the high strength steel comprises the following chemical elements in weight percentages: C: 0.05-0.15%; Si: 0.1-0.4%; Mn: 1.5-3.0%; Al: 0.01-0.05%; Ti: 0.01-0.03%; Cr: 0.4-0.6%, Mo: 0.1-0.3%; and a balance of Fe and unavoidable impurities; and
wherein the cladding layer is a mild steel, a high strength steel, a martensitic steel or a high precipitation strengthened steel;
wherein when the cladding layer is mild steel, the mild steel comprises the following chemical elements in weight percentages: C: 0.0005-0.003%; Si: 0.001-0.01%; Mn: 0.1-0.5%; Al: 0.01-0.04%; Ti ≤ 0.06%; and a balance of Fe and unavoidable impurities; or the mild steel comprises the following chemical elements in weight percentages: C: 0.01-0.04%, Si: 0.01-0.05%; Mn: 0.1-0.5%; Al: 0.01-0.04%, and a balance of Fe and unavoidable impurities;
wherein when the cladding layer is high strength steel, the high strength steel comprises the following chemical elements in weight percentages: C: 0.1-0.3%; Si: 1.3-2.0%; Mn: 1.5-3.0%; Al: 0.01-0.05%; Ti: 0.01-0.03%; Mo ≤ 0.3%; and a balance of Fe and unavoidable impurities; or the high strength steel comprises the following chemical elements in weight percentages: C: 0.05-0.15%; Si: 0.1-0.4%; Mn: 1.5-3.0%; Al: 0.01-0.05%; Ti: 0.01-0.03%; Cr: 0.4-0.6%, Mo: 0.1-0.3%; and a balance of Fe and unavoidable impurities;
wherein when the cladding layer is martensitic steel, the martensitic steel comprises the following chemical elements in weight percentages: C: 0.2-0.3%; Si: 0.1-0.5%; Mn: 1.0-1.6%; Al: 0.01-0.25%; B: 0.001-0.005%; Ti ≤ 0.05%; Cr ≤ 0.3%; Mo ≤ 0.2%; and a balance of Fe and unavoidable impurities;
wherein when the cladding layer is high precipitation strengthened steel, the high precipitation strengthened steel comprises the following chemical elements in weight percentages: C: 0.03-0.08%; Si: 0.1-0.4%; Mn: 1.0-1.5%; Al: 0.01-0.05%; Ti: 0.05-0.12%; and a balance of Fe and unavoidable impurities.

2. The multilayer rolled clad plate according to claim 1, wherein the anisotropic steel plate is a cold rolled steel plate or a hot rolled acid-pickled steel plate.

3. The multilayer rolled clad plate according to claim 1, wherein the anisotropic steel plate has an orientation degree that satisfies: 1.25 ≥ Al ≥ 1.05 before assembling a blank.

4. The multilayer rolled clad plate according to claim 1, wherein the multilayer rolled clad plate comprises five layers, which, in order, are a cladding material layer, a transition layer, a substrate layer, a transition layer, and a cladding material layer, or comprises three layers, which, in order, are a cladding material layer, a transition layer, and a substrate layer; wherein the thickness of each of the substrate layers is 0.5-4.0 mm and the thickness of each of the cladding material layers is in the range of 0.05-0.4 mm.

5. The multilayer rolled clad plate according to claim 1, wherein the multilayer rolled clad plate has a metallic or non-metallic plating layer on at least one surface.

6. The multilayer rolled clad plate according to claim 1, wherein the anisotropic steel plate comprises the following chemical elements in weight percentages: C: 0.01-0.10%; Si: 0.01-0.4%; Mn: 1.0-2.3%; Al: 0.02-0.04%; Ti ≤ 0.05%; Cr ≤ 0.50%; Mo ≤ 0.30%; and a balance of Fe and other unavoidable impurities.

7. The multilayer rolled clad plate according to claim 1, wherein the multilayer rolled clad plate comprises a substrate layer, a transition layer and a cladding material layer, wherein the C content of the transition layer is between that of the substrate layer and the cladding material layer.

8. A manufacturing method for the multilayer rolled clad plate according to claim 1, wherein the manufacturing method comprises the following steps:
(1) providing the transition layer between adjacent cladding layers and the substrate layer for assembling a blank, and vacuumizing between layers;
(2) clad rolling: wherein the blank is heated to 1100-1260° C. and held for 0.5 hours or more, then hot-rolled at a temperature of Ar3 or more, wherein a final rolling temperature is controlled to be greater than 820° C., and after rolling, the blank is cooled at a rate of 30-100° C./s, and then coiled, and wherein the coiling temperature is controlled to be 20-750° C.,
wherein the thickness of each layer of the anisotropic steel plate is 0.5 to 10.0 mm.

9. The manufacturing method according to claim 8, wherein the method further comprises Step (3) of cold rolling.

10. The manufacturing method according to claim 9, wherein the method further comprises Step (4) of annealing: wherein the plate is soaked at a soaking temperature of 700-880° C., and then cooled at a rate of 3-20° C./s to a rapid cooling starting temperature of 600-780° C., and then cooled at a rate of 20-1000° C./s to 150-550° C.

11. The manufacturing method according to claim 10, wherein the method further comprises Step (5) of tempering: wherein a tempering temperature is 150-550° C., and a tempering time is 100s-400s.

12. The manufacturing method according to claim 8, wherein the method further comprises a step of leveling.

13. The manufacturing method according to claim 8, wherein the anisotropic steel plate is a cold rolled steel plate or a hot rolled acid-pickled steel plate.

14. The manufacturing method according to claim 8, wherein the anisotropic steel plate has an orientation degree that satisfies: $1.25 \geq Al \geq 1.05$ before assembling a blank; or the anisotropic steel plate comprises the following chemical elements in weight percentages: C: 0.01-0.10%; Si: 0.01-0.4%; Mn: 1.0-2.3%; Al: 0.02-0.04%; Ti $\leq$ 0.05%; Cr $\leq$ 0.50%; Mo $\leq$ 0.30%; and a balance of Fe and other unavoidable impurities; or the multilayer rolled clad plate comprises a substrate layer, a transition layer and a cladding material layer, wherein the C content of the transition layer is between that of the substrate layer and the cladding material layer.

15. The manufacturing method according to claim 8, wherein the multilayer rolled clad plate comprises one or more transition layers.

16. The manufacturing method according to claim 8, wherein the multilayer rolled clad plate comprises a substrate layer, a transition layer located on one or both sides of the substrate layer, and a cladding material layer located on the outside of the transition layer, wherein the thickness of the substrate layer is 0.5-4.0 mm and the thickness of cladding material layer is in the range of 0.05-0.4 mm; or the multilayer rolled clad plate has a metallic or non-metallic plating layer on at least one surface.

17. The manufacturing method according to claim 8, wherein the thickness of each layer of the anisotropic steel plate is 1 to 3 mm.

* * * * *